2,890,204

EPOXY RESIN COMPOSITIONS

John Delmonte, Glendale, Calif., assignor to Furane Plastics Incorporated, Los Angeles, Calif., a corporation of California No Drawing. Application February 13, 1956
Serial No. 564,878

23 Claims. (Cl. 260—47)

This invention relates to epoxy resins and in particular to a stable liquid acid anhydride curing agent for epoxy resins and accelerators for use therewith.

It is known that reactive epoxy resins may be cured by condensation with polybasic carboxylic acid anhydrides, producing cured epoxy resin products having valuable properties. The commercial epoxy resins are generally mixtures of polyglycidyl ethers made by reacting epichlorohydrin with 2,2-bis(4-hydroxy-phenyl) propane, usually in the presence of alkali. The products are liquid or solid, depending upon the degree of polymerization (see Dearborn et al., Industrial and Engineering Chemistry, vol. 45, pp. 2715 to 2721). The anhydrides of the polybasic carboxylic acids are solids, and the mixing of solid acid anhydride particles with the reactive liquid epoxy resin involves difficulties of uniformity and complete blending of the two ingredients in the preparation of the mixture for use in casting, potting, impregnation, and the like, unless high temperatures and long curing times are subsequently employed. Even with high temperature curing, there is lack of uniformity in the set product.

I have discovered that the operation of mixing uncured liquid epoxy resin and an aromatic acid anhydride is greatly facilitated, and the final cured resin has superior properties, when a relatively small proportion of the active epoxy resin material is pre-reacted with an acid anhydride to form a partial polymer, adduct or eutectic which is liquid at ordinary or operating temperatures. I have also discovered that eutectic mixtures of two or more different acid anhydrides give liquid adducts with relatively minor proportions of reactive epoxy resin to yield stable liquid acid anhydride curing adducts for subsequent use with additional reactive epoxy resin, thus giving greatly improved formulations for potting, impregnation, casting and other useful operations. In particular, I have discovered that hexa-hydro phthalic anhydride forms a stable adduct with active epoxy resin materials in the range of proportions of 2 to 8 parts by weight anhydride to 1 part by weight of the epoxy resin material, which adduct is liquid at room temperature and may be advantageously used as a hardening agent for additional amounts of unset epoxy resin materials. In general, reactive epoxy resins having from 170 to 300 grams of epoxy per mole equivalent of epoxy resin may be used. In preparing the curing adduct, the reaction was preferably continued with mild heating and stirring until at least a viscosity of 250 centipoises at 80° F. was attained, after which the stable liquid acid anhydride adduct was cooled and preserved for subsequent use.

This pre-reacted material is more stable to moisture, etc. than is the acid anhydride alone. The improved stability was observed with reference to the product reacted up to viscosities of 800 centipoises or more, but for practical purposes the limit of viscosity is determined by the necessity for a low enough viscosity to permit the use of the material (with addition of more reactive epoxy resin) in impregnation and the like. When the liquid pre-reacted epoxy resin and acid anhydride composition subsequently is mixed with additional reactive epoxy resin immediately prior to use, the condensation or cured resin product is more uniform and has superior mechanical properties when compared to the usual cured mixture composed of epoxy resin and solid acid anhydride.

I have further discovered that the mixture of my liquid acid anhydride curing adduct with additional reactive epoxy resin is more rapidly cured at elevated temperatures by the addition of small amounts of amines and amides, and particularly the tertiary amines, amides, and polyamides.

The following are typical examples of my acid anhydride curing adduct invention.

Example 1

About 80 parts by weight of hexahydrophthalic anhydride was mixed with 20 parts by weight of an epoxy resin with a combining weight of 180 to 240 grams per mole equivalent of epoxy. The temperature was maintained at 220 to 250° F. until the viscosity at 80° F. was about 800 centipoises. The adduct product was a stable liquid at room temperature when kept out of contact with air, and was subsequently mixed with additional active epoxy resin, and the mixture cured by heating at 300° F. for a period of 12 to 18 hours. These mixtures may also be catalyzed or promoted by the additions, up to about two percent, of tertiary amines, amides, or polyamides (see Example 2).

Example 2

Fifty parts by weight of the acid anhydride-epoxy curing adduct of Example 1 was mixed with 50 parts by weight of a commercial reactive epoxy resin (Araldite 6010), and 2 parts by weight of dimethylamino methyl phenol. The time and temperature of cure was thereby reduced, over the uncatalyzed mixture, to a curing time of 2 to 4 hours at 250° F. The proportions of the "acid anhydride-epoxy" curing adduct to additional reactive epoxy resin is determined in each instance by the stoichiometric equivalent amounts, based upon the epoxy content in both constituent parts.

Example 3

One hundred parts by weight of a eutectic mixture of phthalic anhydride, tetrahydro phthalic anhydride and hexahydro phthalic anhydride was reacted at about 230° F. with 20 parts by weight of a commercial reactive epoxy resin (Araldite 6010). A stable liquid was formed which reacts with stoichiometric proportions of additional epoxy resin (for example Araldite 6010) to give useful solids of improved strength and uniformity when cured at 300° F. for 12 to 18 hours without the addition of a promoter, or when cured for 2 to 4 hours at 250° F. when a promoter such as dimethylamino methyl phenol is added to the extent of about two percent.

Example 4

A liquid eutectic consisting of 50 parts by weight of methyl nadic anhydride and 50 parts by weight of hexahydrophthalic anhydride was reacted with 10 parts by weight of a reactive epoxy resin (Araldite 6010) at 200° F. until a desired viscosity of about 500 centipoises was attained. The liquid "acid anhydride-epoxy" curing adduct was subsequently mixed, at the time of use, with a stoichiometric proportion of reactive epoxy resin (Araldite 6010) under the same conditions and with similar results to those described above in Examples 1 and 2.

Example 5

Adducts of diene compounds or substituted diene compounds with maleic anhydride, which adducts behave somewhat like acid anhydrides, may be used as equivalent anhydrides alone or in eutectic mixtures. For example, eutectic mixtures of "het" acid anhydride (maleic anhydride adduct of hexachloro pentadiene) and hexahydro phthalic anhydride were found in the range of 30 to 90 parts by weight of "het" acid anhydride to 100 parts by weight of hexahydro phthalic anhydride. These eutectics were reacted with reactive epoxy resins (Araldite 6010) in the ratio of 10 parts by weight of eutectic to 1 to 2 parts by weight of epoxy resin to form stable "acid anhydride-epoxy" curing adduct liquids at room temperature. When mixed with additional epoxy resin, as described above in Example 1 without added promoters, or in Example 2 with up to 2 percent promoter, the mixtures were cured with similar advantageous results.

*Example 6*

Liquid eutectic mixtures of maleic anhydride and pyromellitic anhydride were also stabilized by minor proportions of epoxy resins to give liquid "acid anhydride-epoxy" curing adducts useful as described in Examples 1 and 2 above.

The specific acid anhydrides and maleic anhydride-diene or -substituted diene compounds given in the above illustrated examples may be used alone, as described for hexahydro phthalic anhydride in Example 1, or a plurality of such acid anhydrides diene compounds may be used, either in proportions to form the lowest melting eutectics, or in other proportions to form low melting mixtures which may not be true eutectics.

The term "acid anhydride-epoxy curing adduct" is given to the above described reaction products consisting of a relatively minor proportion of (1) a reactive epoxy resin and (2) a major proportion of an aromatic acid anhydride, that is, in the range of 1:2 and 1:10; including in (2) eutectic mixtures of two or more different acid anhydrides, and maleic anhydride-diene adducts or maleic anhydride-substituted diene adducts.

The group of promoters or catalysts which I have found to be useful in reducing the time and temperature of curing of the mixtures of the liquid "acid anhydride-epoxy" curing adducts in the above described examples are tertiary amines, amides and polyamides. Specific examples which have been found to be effective in reducing cure time and temperature in my invention are dimethylamino methyl phenol, 1 hydroxyethyl 2 heptadecenyl glyoxalidine, piperidine, alcohol amines, dialkyl amino propylamine, triethylamine, triethanolamine, polyamides (for example, General Mills "Versamid" 115 and "Versamid" 125) and formamide. The polyamine catalysts with active hydrogens, for example diethylene triamine and triethylene tetramine, were also effective but were too rapid in action for practical use even when used in amounts less than one percent by weight. Not more than, and usually considerably less than, 2 percent by weight of the catalyst or promoter was required to effectively reduce the reaction times and temperatures. Larger amounts of catalyst reduced the high temperature characteristics of the cured resins and are not desirable.

Thin coatings of the above promoters or catalysts placed upon the surfaces of laminates, or upon the surfaces being bonded, were also discovered to be effective in reducing the cure time at lower temperatures, and this provides a new method for using these promoters with my "acid anhydride-epoxy" curing adduct mixtures.

The catalytic quantities of the tertiary amines, amides and polyamides may be pre-mixed or pre-reacted with the major portion of the reactive epoxy resin prior to the mixing with the liquid "acid anhydride-epoxy" curing adduct above described, thus providing a system of two liquid components which, because of their liquid state, may be readily mixed immediately prior to use. This is a marked improvement in the practical handling of these materials, because each of the two component liquids is relatively stable when kept free from atmospheric exposure, and they are readily mixed prior to use because both components are liquid. The advantages of a two components liquid system over a three component system having one or two solid or crystalline components will be readily understood.

I claim:

1. A composition of matter adapted for use as a curing agent for polyglycidal ether of 2,2 bis(4-hydroxy-phenyl) propane epoxy resins, comprising a pre-reacted mixture of from 2 to 10 parts by weight of an acid anhydride ingredient selected from the group consisting of hexahydrophthalic acid anhydride, tetrahydrophthalic acid anhydride, phthalic acid anhydride, maleic anhydride adduct of cyclopentadiene, and maleic anhydride adduct of hexachloropentadiene, and one part by weight of said epoxy resin, said prereacted mixture being liquid at ambient temperatures.

2. The composition defined in claim 1 in which the acid anhydride ingredient consists of a mixture of a plurality of different acid anhydrides selected from the group consisting of hexahydrophthalic anhydride, tetrahydrophthalic anhydride, phthalic anhydride, maleic anhydride adduct of cyclopentadiene and maleic anhydride adduct of hexachloropentadiene.

3. The composition defined in claim 1 in which the acid anhydride ingredient consists of a eutectic mixture of a plurality of different acid anhydrides selected from the group consisting of hexahydrophthalic anhydride, tetrahydrophthalic anhydride, phthalic anhydride, maleic anhydride adduct of cyclopentadiene and maleic anhydride adduct of hexachloropentadiene.

4. The composition defined in claim 1 in which the ingredients have been pre-reacted to a material having a viscosity of at least 250 centipoises at 80° F.

5. The composition defined in claim 1 in which the acid anhydride ingredient comprises hexahydro phthalic anhydride.

6. The composition defined in claim 1 in which the acid anhydride ingredient comprises tetrahydro phthalic anhydride.

7. The composition defined in claim 1 in which the acid anhydride ingredient comprises phthalic anhydride.

8. The composition defined in claim 1 in which the acid anhydride ingredient comprises maleic anhydride adduct of cyclopentadiene.

9. The composition defined in claim 1 in which the acid anhydride ingredient comprises maleic anhydride adduct of hexachloropentadiene.

(Rewritten Amended Claim 10)

10. In the process of hardening a reactive polyglycidal ether of 2,2 bis(4-hydroxy-phenyl) propane epoxy resin, the step of mixing with said resin, a liquid "acid anhydride-epoxy" curing adduct consisting of from 2 to 10 parts by weight of acid anhydrides selected from the group consisting of hexahydrophthalic acid anhydride, tetrahydrophthalic acid anhydride, phthalic acid anhydride, maleic anhydride adduct of cyclopentadiene, and maleic anhydride adduct of hexachloropentadiene, and one part by weight of said reactive epoxy resin; and heating the mixture to form a hard resin.

11. In the process of hardening a reactive polyglycidal ether of 2,2 bis(4-hydroxy-phenyl) propane epoxy resin, the step of mixing with said resin a liquid "acid anhydride-epoxy" curing adduct consisting of from 2 to 10 parts by weight of acid anhydrides selected from the group consisting of hexahydro-phthalic acid anhydride, tetrahydrophthalic acid anhydride, phthalic acid anhydride, maleic anhydride adduct of cyclopentadiene, and maleic anhydride adduct of hexachloropentadiene, with 1 part by weight of said epoxy resin, and an added catalytic amount not exceeding two percent based upon the weight of resin and curing adduct, of a nitrogen compound catalyst selected from the group consisting of tertiary amines, amides, and polyamides; and then heating the mixture to form a hard resin.

12. The composition of matter defined in claim 14 in which the nitrogen compound catalyst is selected from the group consisting of dimethylamino methyl phenol, 1 hydroxyethyl 2 heptadecenyl glyoxalidine, piperidine, alcohol amines, aliphatic acid amides, dialkyl amino propylamine, and triethylamine.

13. In the process of hardening a reactive polyglycidal ether of 2,2 bis(4-hydroxy-phenyl) propane epoxy resin in contact with surfaces of objects to be impregnated, coated or adhesively attached to other surfaces, the step of dispersing on said surfaces a thin coating of a nitrogen compound catalyst adapted to catalyze the curing of a mixture of said epoxy resin and the prereacted mixture as defined in claim 1, said catalyst being selected from the group consisting of tertiary amines, amides and polyamides; covering said catalyst-coated surfaces with a liquid mixture of said epoxy resin and said curing adduct; and then heat curing said coatings.

14. A composition of matter comprising a reactive polyglycidal ether of 2,2 bis(4-hydroxy-phenyl) propane epoxy resin in which there is commingled not more than two percent by weight of an amino compound catalyst to promote the setting of said reactive epoxy resin, and a liquid "acid anhydride-epoxy" curing adduct consisting of a pre-reacted mixture of from 2 to 10 parts by weight of an acid anhydride ingredient selected from the group consisting of: hexachloro phthalic acid anhydride, tetrahydrophthalic acid anhydride, phthalic acid anhydride, maleic anhydride adduct of cyclopentadiene, and maleic anhydride adduct of hexachloropentadiene, and one part by weight of said epoxy resin.

15. The composition of matter defined in claim 14 in which the nitrogen compound catalyst is dimethylamino methyl phenol.

16. The composition of matter defined in claim 14 in which the nitrogen compound catalyst is 1 hydroxyethyl 2 heptadecenyl glyoxalidine.

17. The composition of matter defined in claim 14 in which the nitrogen compound catalyst is piperidine.

18. The composition of matter defined in claim 14 in which the nitrogen compound catalyst is an alcohol amine.

19. The composition of matter defined in claim 14, in which the nitrogen compound catalyst is aliphatic acid amides.

20. The composition of matter defined in claim 14 in which the nitrogen compound catalyst is a polyamide.

21. The composition of matter defined in claim 14 in which the nitrogen compound catalyst is dialkyl amino propylamine.

22. The composition of matter defined in claim 14 in which the nitrogen compound catalyst is triethylamine.

23. The composition of matter defined in claim 14 in which the nitrogen compound catalyst is triethanolamine.

References Cited in the file of this patent

UNITED STATES PATENTS

| | | |
|---|---|---|
| 2,324,483 | Castan | July 20, 1943 |
| 2,651,589 | Shokal | Sept. 8, 1953 |
| 2,801,229 | DeHoff et al. | July 30, 1957 |

FOREIGN PATENTS

| | | |
|---|---|---|
| 133,819 | Australia | Aug. 10, 1949 |
| 503,546 | Belgium | June 15, 1952 |
| 511,733 | Belgium | Nov. 29, 1952 |